United States Patent Office 2,832,720
Patented Apr. 29, 1958

2,832,720

VITAMIN COMPOSITIONS AND METHOD OF PREPARING SAME

Frederick A. Bacher, Westfield, and Henry T. Meriwether, Jr., Roselle, N. J., assignors to Merck & Co., Inc., Rahway, N. J., a corporation of New Jersey No Drawing. Application March 1, 1954
Serial No. 413,479

26 Claims. (Cl. 167—81)

This invention relates to vitamin compositions. More particularly, this invention is concerned with novel vitamin compositions of high stability in which one or more vitamins are incorporated with a salt of a non-volatile aliphatic carboxylic acid.

Today large quantities of vitamins are produced by synthetic methods and are also obtained from natural sources in highly concentrated forms. These substances are not only used to maintain and improve the physical well-being of humans but it has also been found economically feasible to fortify the animal diet with vitamins. Since vitamins are very active physiologically, it is ordinarily unnecessary and, in fact, it is usually undesirable, to administer such substances in highly concentrated forms. On the contrary, it has been found desirable to administer the vitamins in the form of vitamin compositions composed of one or more vitamins combined with a carrier or diluent. In this manner the vitamin concentration can be readily adjusted to any desired dosage. Many types of compositions have been proposed. However, even though some progress has already been made, the compositions previously produced lack many desirable properties. Thus, none of the vitamin compositions prepared hereto have had completely satisfactory stability.

It is an object of this invention to provide novel vitamin compositions which have high stability. Another object is to provide novel vitamin compositions which are suitable as, and for use in, pharmaceutical preparations such as tablets or capsules for administration to humans and also in the fortification of animal feeds and feed supplements. It is also an object to provide novel vitamin compositions having physical properties varying from viscous liquids to free-flowing granulations. One other object of this invention is to provide processes of producing such compositions. Additional objects will appear from the following description of the invention.

According to the present invention these and other objects apparent from the following description have been attained by the discovery of novel vitamin compositions. These novel vitamin compositions comprise at least one vitamin or equivalent vitaminaceous material intimately admixed in a salt of a non-volatile aliphatic carboxylic acid. Other substances such as antioxidants, peptizing agents and plasticizers may also be included in these novel vitamin compositions to obtain the advantages which such substances exert.

The novel vitamin compositions of this invention are produced by effecting the intimate contact of a vitamin with a suitable metallic salt of a non-volatile aliphatic carboxylic acid. This may be conveniently achieved by several very closely related procedures. Thus, the vitamin and a metallic salt of a carboxylic acid may be combined by liquifying the salt and thereafter combining it with the vitamin and subsequently cooling the mixture. Similarly, a suitable metallic salt of a carboxylic acid may be dissolved in a solvent, the vitamin dispersed therein and the solvent evaporated from the mixture to produce the desired vitamin composition. Preferably however, the metallic salt of a non-volatile aliphatic carboxylic acid can be formed in situ in the presence of a vitamin by the reaction of a suitable metallic alcoholate with a non-volatile aliphatic carboxylic acid.

Novel compositions are produced according to these methods containing at least one or more of the vitamins. Both the water soluble vitamins like thiamin, riboflavin, ascorbic acid and vitamin $B_{12}$ and oil soluble vitamins such as vitamin A, alpha-tocopherol and vitamin D may be used either singly or in various combinations to produce the novel vitamin compositions. Such vitamins may be obtained from natural sources or according to synthetic procedures and, in addition, can be used in any generally acceptable active form or derivative. For example, vitamin A can be employed as the free alcohol or as an active derivative such as vitamin A acetate or vitamin A palmitate.

The metallic salts of non-volatile aliphatic carboxylic acids suitable for use in the preparation of these novel vitamin compositions are those derived from an acid having at least 8 carbon atoms and a metallic cation which is physiologically acceptable and at least divalent. For practical reasons however, it is generally preferred to employ carboxylic acids which have 25 carbon atoms or less. Specific examples of metallic salts of aliphatic carboxylic acids which may be used in these novel vitamin compositions are the aluminum, magnesium and calcium salts of lauric acid, palmitic acid and stearic acid.

The preparation of the novel vitamin compositions may be achieved by several similar procedures as set forth broadly above. It is ordinarily preferred, however, to effect production of the compositions by in situ formation of a metallic salt of an aliphatic carboxylic acid by the reaction of a metal alcoholate with a suitable aliphatic carboxylic acid in the presence of one or more vitamins. Some of the metal alcoholates which may be used in this method are aluminum, magnesium and calcium methylates, ethylates, n-propylates, isopropylates, butylates, phenylates and mixed alcoholates thereof. The source or purity of the aliphatic carboxylic acids is not critical and acids such as stearic, 2-ethyl-hexoic lauric and palmitic acids and mixtures thereof may be conveniently employed. They may be obtained from either animal or vegetable sources. The most suitable acids for use in preparing these vitamin compositions are those having from 8 to 25 carbon atoms.

Reaction between the metal alcoholate and aliphatic carboxylic acid to form the corresponding metallic salt of the aliphatic carboxylic acid may be achieved by contacting the reactants in the absence of a solvent or in the presence of an inert solvent. Volatile solvents are particularly useful since they may be readily removed from the resulting vitamin composition by evaporation. Examples of some suitable solvents that may be used are benzene, toluene, chloroform, petroleum ether, carbon tetrachloride and mixtures of such solvents.

In the preparation of the novel vitamin compositions according to this method it is desirable that the in situ formation of the metallic salt of an aliphatic carboxylic acid be achieved in the presence of the vitamin. One way in which such a desideratum may be conveniently effected is by mixing a solvent solution of a vitamin and metal alcoholate with a solvent solution of an aliphatic carboxylic acid. The resulting mixture obtained in this manner has the vitamin thoroughly dispersed throughout the reaction product. Such compositions can be prepared containing any convenient vitamin concentrations according to the particular use to which they are to be put. Thus, compositions containing from 50,000 to 300,000 units/g. of vitamin A alone or in combination with other vitamins may be readily produced.

Various ratios of reactants may be conveniently utilized in the production of these compositions although an excess of the metal alcoholate is ordinarily desirable. Compositions having the most satisfactory properties are obtained using ratios of one molar equivalent of metal alcoholate to approximately 0.25 to 2, and preferably 1.5, molar equivalents of carboxylic acid.

Under solvent conditions the described reaction may be conveniently effected at both room temperature and slightly elevated temperatures up to about 80° C., and preferably 30 to 60° C. At the elevated temperatures the reaction goes to completion in a short time while at the lower temperatures somewhat more extended reaction periods are required. It is sometimes desirable to effect the reaction under an inert atmosphere to safeguard the vitamin content of the mixture.

It is generally desirable to introduce various plasticizers such as lecithin and triethanolamine into the vitamin compositions to regulate the viscosity of the reaction mixture. Such plasticizers may be introduced into the compositions at any suitable time although it has been found advantageous to have them present during the reaction.

Antioxidants are also preferably incorporated in the vitamin compositions and may be conveniently added simultaneously with the vitamin content. In general, any of the antioxidants normally used to enhance the stability of vitamins are suitable for inclusion in these compositions, among which are butylated hydroxy anisole, ascorbyl palmitate, gentisic acid, nordihydroquaiaretic acid, ethylhydrocaffeate, propylgallate and the like. These and similar antioxidants may be used in any suitable amounts such as from 2 to 50%, and preferably 10 to 30%, by weight of the vitamin content.

After the reactants, antioxidants, plasticizers and vitamins have been united and the reaction has gone to completion a small amount of water can be added to the mixture if desired.

The compositions are recovered from the reaction mixture by evaporation of the solvent and/or drying. The resulting compositions may vary in physical properties from highly viscous liquids which are substantially moldable solids to compositions that are hard and brittle depending on the reaction conditions. The physical state of the compositions is, of course, conveniently regulated by selection of the most suitable plasticizers, adjustment of the vitamin content and use of the most suitable metal salts of the aliphatic carboxylic acids having the desired properties. Thus, the compositions can be custom made for any intended purposes such as for use in tablets, capsules or in pulverized form for use in fortifying animal feeds. These vitamin compositions can be coated with a suitable film such as mazein or pharmaceutical shellac to further protect the vitamin content.

Such vitamin compositions are also prepared by the reaction of a metal alcoholate with a non-volatile aliphatic carboxylic acid in the absence of a solvent. This is readily accomplished by reacting a liquid metal alcoholate with a liquid aliphatic carboxylic acid in the presence of one or more vitamins plus antioxidants and plasticizers as desired. After the reaction has been completed a small amount of water may be added to the mixture to produce a more brittle vitamin composition. The mixture is then cooled, dried and subdivided as desired.

In addition to the methods just described these novel vitamin compositions are also prepared by the direct admixture of one or more vitamins with a suitable metallic salt of a non-volatile aliphatic carboxylic acid or mixtures of such salts. This is conveniently accomplished by mixing the vitamin, plus antioxidants and plasticizers as desired, with a metallic salt of an aliphatic carboxylic acid under solvent conditions or by employing a liquid or liquified acid salt sans solvent. Various vitamins, antioxidants, plasticizers and metallic salts of aliphatic carboxylic acids can be used in preparing the vitamin compositions as previously set forth herein and the resulting products may be handled as already described.

The following examples are included to illustrate specific applications of the invention but it should be recognized that the scope of the invention is not to be restricted to the particular embodiments disclosed in these examples.

Example 1

Ten grams of aluminum isopropylate is dissolved in 20 ml. of benzene with warming. To this solution is added a benzene solution of 2.5 g. of lecithin, 0.25 g. of butylated hydroxy anisole and 1.2 g. of a vitamin A acetate oil assaying about 70% vitamin A in 20 ml. of benzene. Twenty grams of stearic acid is dissolved in 40 ml. of benzene at 50° C. and added slowly to the above solution. The resulting reaction mixture is poured into an evaporating tray to form a thin layer and allowed to stand for one day to evaporate the benzene and leave a clear yellow film. The product is then dried at 40–45° C. for a short time and finally ground to a particle size of about 50 mesh. The product is comprised of small particles containing vitamin A and the added antioxidants intimately and uniformly mixed with aluminum stearate.

Example 2

To a 5 gallon vessel is charged 8.45 pounds of benzene and 2.4 pounds of aluminum isopropylate. After stirring the mixture at 50–55° C. under nitrogen until the solution is clear, 271 gm. of lecithin and 27.2 gm. of butylated hydroxy anisole are added. Stirring is continued at 50–55° C. until no solids are visible. Then 0.3 pound of 70–80% vitamin A acetate is added to the solution with stirring.

While the above solution is being prepared a second solution is made by dissolving 4.8 pounds of stearic acid in 8.45 pounds of benzene at 40° C. with stirring.

The stearic acid solution is then added to the aluminum isopropylate solution over a 30 minute period at 40° C., with agitation. The agitation is continued about 5 minutes after the addition is completed. 180 ml. of water is then added to the solution over a 1 minute period. Agitation of the solution is continued for 30 minutes during which time the viscosity of the mixture increases and subsequently decreases.

The mixture is then placed in trays in thin layers and dried at 25–30° C. for 16 hours. After drying for this time the product consists of an intimate mixture of vitamin A acetate, aluminum stearate and antioxidants. The product is removed from the trays, broken into lumps and dried an additional 16 hours at about 40° C. The dry material is then ground to a small particle size, preferably to pass 30 mesh. It is a non-sticky, free flowing powder.

The product is coated by dissolving 400 g. of mazein in 1750 ml. of ethanol and 250 ml. of water at 50° C. with stirring, and spraying 165 ml. of the resulting solution onto 600 g. of the product, produced as above. During the coating operation, the product is rotated in a coating pan. It is then dried at about 40° C. for 16 hours.

The procedure of this example is repeated using ¼ and ½ the specified quantity of benzene. The resulting vitamin compositions are undistinguishable from the compositions obtained using larger quantities of benzene. However, the reaction mixture is more viscous and necessitates more powerful stirring.

Example 3

The procedure of Example 2 is followed without the addition of water. The resulting product is pliable after drying for 12 hours at 40° C. but hardens to a brittle solid after prolonged drying up to about two days or more.

Example 4

The procedure of Example 2 is followed with 10% less stearic acid and with the lecithin content replaced by an equal weight of triethanolamine. The resulting product consists of vitamin A acetate, butylated hydroxy anisole and triethanolamine intimately and uniformly admixed with aluminum stearate. After milling, it is a dry, free-flowing granular material.

Example 5

The procedure of Example 2 is followed. However, no water is added, 10% less stearic acid is employed and the lecithin is replaced by an equal weight of triethanolamine. The product remains pliable longer and dries to hardness more slowly than when water is added. Because of its pliability, however, the product is suitable for extrusion into pellets or for molding.

Example 6

Magnesium isopropylate may be substituted for aluminum isopropylate and the method of Example 2 repeated. The resulting product consists of vitamin A acetate, lecithin and butylated hydroxy anisole intimately admixed in magnesium stearate.

Example 7

Magnesium isopropylate and triethanolamine may be substituted for aluminum isopropylate and lecithin respectively and the procedure of Example 2 repeated. The resulting product consists of vitamin A acetate, butylated hydroxy anisole and triethanolamine intimately admixed with magnesium stearate.

Example 8

To 25 ml. of chloroform is added 8 g. of aluminum butylate with stirring and heating to promote solution. To the resulting solution is added 2 g. of lecithin, 0.2 g. of ascorbyl palmitate and 1 g. of vitamin A palmitate oil in 20 ml. of chloroform. After solution is effected 20 g. of lauric acid in 20 ml. of chloroform is added to the mixture at 50° C. The reaction mixture is then poured onto trays in a thin layer and heated at 45° C. until the chloroform has evaporated. The product consists of aluminum laurate intimately admixed with vitamin A palmitate, lecithin and ascorbyl palmitate.

Example 9

Magnesium ethylate may be reacted with palmitic acid in the presence of vitamin A acetate, triethanolamine, butylated hydroxy anisole and alpha-tocopherol in petroleum ether. The product obtained consists of vitamin A acetate, alpha-tocopherol, butylated hydroxy anisole and triethanolamine uniformly and stably admixed in magnesium palmitate.

Example 10

80 g. of aluminum isopropylate is melted at about 118° C. and supercooled to about 55° C. To it is added 16 g. of triethanolamine with stirring over a 5 minute period followed by the addition of 2 g. of butylated hydroxy anisole and 10 g. of vitamin A acetate. About 160 g. of melted stearic acid is added to the mixture at 55–60° C. over a period of 15 minutes in a heavy duty mixer. After 5 minutes' additional mixing there is added 14 ml. of water and stirring is continued until the material breaks into small lumps. It is air dried at 40° C. for 16 hours and then milled into small particles. The product consists of particles of vitamin A acetate, triethanolamine and butylated hydroxy anisole admixed with aluminum stearate.

Example 11

The procedure of Example 10 is followed except that a mixture of 28 ml. of water and 50 ml. of alcohol is added to the reaction mixture instead of 14 ml. of water. The resulting reaction mixture is more easily stirred. The product is recovered as in Example 10.

Example 12

A slurry of 7.5 g. of aluminum mono-stearate and 7.5 g. of aluminum distearate in 130 ml. of benzene is prepared. To this solution is added a solution of 0.75 g. of vitamin A acetate, 1.5 g. of lecithin and 0.2 g. of butylated hydroxy anisole dissolved in 20 ml. of benzene. The mixture is warmed gradually to 50° C. with stirring. The stirring is continued until the mixture becomes clear. It is then poured into a tray in a thin layer and dried overnight. It forms a thin, hard, clear film which is crushed to a powder.

Example 13

The method of Example 12 is repeated substituting 15 g. of aluminum monostearate for the combination of mono- and di-stearates employed in this example. A more viscous product is produced which dries more slowly but which nevertheless is brittle once dried.

Example 14

Example 12 is repeated using 15 g. of aluminum distearate in place of the combination of mono- and di-stearates therein utilized. The resulting product is not as hard as the product obtained in Example 12.

Example 15

Triethanolamine is substituted for the lecithin employed in Example 12 and the method of that example is repeated. This substitution reduces the viscosity and the product so obtained is softer.

Example 16

Magnesium palmitate, nordihydroguaiaretic acid, lecithin, vitamin A acetate, alpha-tocopherol and vitamin $B_2$ are added to chloroform. After stirring for 15 minutes at 45° C., the chloroform may be removed by conventional methods to give the desired vitamin composition.

Example 17

Aluminum stearate, triethanolamine, butylated hydroxy anisole, vitamin A acetate, vitamin $B_{12}$, alpha-tocopherol and riboflavin are added to benzene with stirring. By removing the benzene the desired stable vitamin composition may be obtained.

Various changes and modifications of the invention can be made and, to the extent that such variations incorporate the spirit of this invention, they are intended to be included within the scope of the appended claims.

What is claimed is:

1. A method for producing a stabilized vitamin composition comprising transparent particles of an intimate homogeneous solid solution of a vitamin and a salt, which comprises reacting in solution an alcoholate selected from the group consisting of aluminum, magnesium and calcium lower alcoholates with an aliphatic monocarboxylic acid containing more than eight carbon atoms in the presence of a vitamin soluble in the reaction medium to form the corresponding salt of the acid intimately admixed in solution with the vitamin, separating the mixture of vitamin and salt as a solid solution from the reaction mixture and pulverizing the solid solution to form transparent particles of the salt and vitamin in solid solution.

2. The method of claim 1 wherein the vitamin is vitamin A.

3. The method of claim 1 wherein the reaction is carried out in an inert, volatile organic solvent for the reactants.

4. The method of claim 1 wherein an antioxidant and a plasticizer from the group consisting of triethanolamine and lecithin are added to the reaction mixture.

5. The method of claim 1 wherein triethanolamine is added to the reaction mixture.

6. The method of claim 1 wherein lecithin is added to the reaction mixture.

7. The method of claim 1 wherein butylated hydroxy anisole is added to the reaction mixture.

8. A method for producing a stabilized vitamin composition comprising transparent particles of an intimate homogeneous solid solution of a vitamin and a salt, which comprises intimately admixing in solution a salt selected from the group consisting of aluminum, magnesium and calcium salts of aliphatic monocarboxylic acids containing more than eight carbon atoms with a vitamin soluble in the solution, separating from the solution the mixture of vitamin and salt as a solid solution and pulverizing the solid solution to form transparent particles of the salt and vitamin in solid solution.

9. The method of claim 8 wherein the vitamin is vitamin A.

10. A method for producing a stabilized vitamin composition comprising transparent particles of an intimate homogeneous solid solution of vitamin A and aluminum stearate, which comprises reacting in a benzene solution aluminum isopropylate with stearic acid in the presence of vitamin A to form aluminum stearate intimately admixed in solution with the vitamin, removing the volatile components of the reaction mixture to leave a solid solution of the vitamin and aluminum stearate, and pulverizing the solid solution to form transparent particles of aluminum stearate containing the vitamin in solid solution.

11. The method of claim 10 wherein lecithin and butylated hydroxy anisole are added to the reaction mixture.

12. The method of claim 10 wherein triethanolamine and butylated hydroxy anisole are added to the reaction mixture.

13. A method for producing a stabilized vitamin composition comprising transparent particles of an intimate homogeneous solid solution of vitamin A and magnesium stearate, which comprises reacting in a benzene solution magnesium isopropylate with stearic acid in the presence of vitamin A to form magnesium stearate intimately admixed in solution with the vitamin, removing the volatile components of the reaction to leave a solid solution of the vitamin and magnesium stearate and pulverizing the solid solution to form transparent particles of magnesium stearate containing the vitamin in solid solution.

14. The method of claim 13 wherein lecithin and butylated hydroxy anisole are added to the reaction mixture.

15. The method of claim 13 wherein triethanolamine and butylated hydroxy anisole are added to the reaction mixture.

16. A method for producing a stabilized vitamin composition comprising transparent particles of an intimate homogeneous solid solution of vitamin A and aluminum laurate, which comprises reacting in solution aluminum butylate with lauric acid in the presence of vitamin A, lecithin and ascorbyl palmitate to form aluminum laurate intimately admixed in solution with the vitamin, removing the volatile components of the reaction mixture to leave a solid solution of the vitamin and aluminum laurate and pulverizing the solid solution to form transparent particles of aluminum laurate containing the vitamin in solid solution.

17. A method for producing a stabilized vitamin composition comprising a transparent intimate homogeneous solid solution of a vitamin and a salt which can be readily molded into various shapes such as pellets, tablets and the like, which comprises intimately admixing in solution a salt selected from the group consisting of aluminum, magnesium and calcium salts of aliphatic monocarboxylic acids containing more than eight carbon atoms with a vitamin soluble in the solution and separating from the mixture the vitamin and salt as a solid solution.

18. The method of claim 17 wherein a plasticizer from the group consisting of triethanolamine and lecithin and an antioxidant are added to the solution.

19. A stable vitamin composition comprising a transparent intimate homogeneous solid solution of a vitamin and a salt selected from the group consisting of aluminum, magnesium and calcium salts of aliphatic monocarboxylic acids containing more than eight carbon atoms.

20. A stable vitamin composition comprising transparent particles of an intimate homogeneous solid solution of vitamin A and a salt selected from the group consisting of aluminum, magnesium and calcium salts of aliphatic monocarboxylic acids containing more than eight carbon atoms.

21. A stable vitamin composition comprising transparent particles of an intimate homogeneous solid solution of a vitamin and a salt selected from the group consisting of aluminum, magnesium and calcium salts of aliphatic monocarboxylic acids containing more than eight carbon atoms having dispersed in the solid solution an antioxidant and a plasticizer from the group consisting of triethanolamine and lecithin.

22. A stable vitamin composition comprising transparent particles of an intimate homogeneous solid solution of vitamin A and an aluminum salt of an aliphatic monocarboxylic acid containing more than eight carbon atoms.

23. A stable vitamin composition comprising transparent particles of an intimate homogeneous solid solution of vitamin A and a magnesium salt of an aliphatic monocarboxylic acid containing more than eight carbon atoms.

24. A stable vitamin composition comprising transparent particles of an intimate homogeneous solid solution of vitamin A acetate and aluminum stearate.

25. A stable vitamin composition comprising transparent particles of an intimate homogeneous solid solution of vitamin A acetate and magnesium stearate.

26. A stable vitamin composition comprising transparent particles of an intimate homogeneous solid solution of vitamin A acetate and aluminum laurate.

References Cited in the file of this patent

UNITED STATES PATENTS

| | | |
|---|---|---|
| 1,638,700 | Molofsky | Aug. 9, 1927 |
| 1,822,934 | Murrill | Sept. 15, 1931 |
| 1,897,039 | Christiansen | Feb. 14, 1933 |
| 2,167,002 | Pacini | July 25, 1939 |
| 2,426,762 | Chanin | Sept. 2, 1947 |
| 2,563,835 | Gribbins | Aug. 14, 1951 |
| 2,571,797 | Upham | Oct. 16, 1951 |
| 2,628,930 | Zentner | Feb. 17, 1953 |
| 2,643,209 | Goett | June 23, 1953 |